United States Patent
Ronner et al.

(10) Patent No.: US 8,045,347 B2
(45) Date of Patent: Oct. 25, 2011

(54) METHOD FOR OPERATING A CONVERTER CIRCUIT, AND APPARATUS FOR CARRYING OUT THE METHOD

(75) Inventors: Beat Ronner, Maisprach (CH); Osvin Gaupp, Baden (CH)

(73) Assignee: ABB Schweiz AG, Baden (CH)

( * ) Notice: Subject to any disclaimer, the term of this patent is extended or adjusted under 35 U.S.C. 154(b) by 451 days.

(21) Appl. No.: 12/389,744

(22) Filed: Feb. 20, 2009

(65) Prior Publication Data

US 2009/0212641 A1 Aug. 27, 2009

(30) Foreign Application Priority Data

Feb. 22, 2008 (EP) .................................... 08151808

(51) Int. Cl.
*H02M 1/12* (2006.01)
(52) U.S. Cl. ......................................................... 363/39
(58) Field of Classification Search .................. 363/39, 363/41, 42, 43, 45, 48; 307/105
See application file for complete search history.

(56) References Cited

U.S. PATENT DOCUMENTS

| | | | |
|---|---|---|---|
| 5,349,517 A * | 9/1994 | Brennen .......................... | 363/40 |
| 5,648,894 A | 7/1997 | DeDoncker et al. | |
| 6,466,465 B1 | 10/2002 | Marwali | |
| 6,472,775 B1 | 10/2002 | Huang et al. | |
| 7,355,865 B2 * | 4/2008 | Royak et al. ..................... | 363/44 |
| 7,403,404 B2 * | 7/2008 | Oka et al. ......................... | 363/40 |
| 2007/0263418 A1 | 11/2007 | Ponnaluri et al. | |
| 2007/0296381 A1 | 12/2007 | Conticelli et al. | |

FOREIGN PATENT DOCUMENTS

EP 1 870 997 A1 12/2007

OTHER PUBLICATIONS

L.A. Serpa et al., "A Modified Direct Power Control Strategy Allowing the Connection of Three-Phase Inverter to the Grid through LCL Filters," IEEE, 2005, pp. 565-571.

* cited by examiner

*Primary Examiner* — Gary L Laxton
(74) *Attorney, Agent, or Firm* — Buchanan Ingersoll & Rooney PC

(57) ABSTRACT

A method for operating a converter circuit is disclosed. Such a converter circuit has a converter unit with a multiplicity of actuatable power semiconductor switches and is connected to a three-phase electrical AC mains system and in which the actuatable power semiconductor switches are actuated by means of an actuation signal ($S_A$) formed from a control signal ($S_R$), and the control signal ($S_R$) is formed by adjusting an H-th harmonic component of system currents ($i_{NH}$) to a system current setpoint value ($i_{NHref}$), wherein H=1, 2, 3 . . . . For the purpose of reducing a harmonic component in the system voltages, the system current setpoint value ($i_{NHref}$) is formed by adjusting the absolute value of an H-th harmonic component of the system voltages ($u_{NH}$) to the absolute value of a prescribable system voltage setpoint value ($u_{NHref}$). An exemplary apparatus carries out the method.

19 Claims, 3 Drawing Sheets

US 8,045,347 B2

METHOD FOR OPERATING A CONVERTER CIRCUIT, AND APPARATUS FOR CARRYING OUT THE METHOD

RELATED APPLICATION

This application claims priority under 35 U.S.C. §119 to European Patent Application No. 08151808.6 filed in Europe on Feb. 22, 2008, the entire content of which is hereby incorporated by reference in its entirety.

TECHNICAL FIELD

The disclosure relates to the field of power electronics. It is based on a method for operating a converter circuit and on an apparatus for carrying out the method.

BACKGROUND INFORMATION

Known converter circuits comprise a multiplicity of actuatable power semiconductor switches which are connected in a known manner in order to switch at least two switching voltage levels. Typically, a converter circuit of this kind is connected to an electrical AC mains system of, in particular, three-phase design. Such converter circuits are frequently used in industrial installations, wherein the converter circuits are coupled to the mains and wherein further fields of use and opportunities for use are naturally conceivable.

For operation of the converter circuit, a control apparatus is provided which has a control unit for forming a control signal by adjusting an H-th harmonic component of system currents to a system current setpoint value and which is connected to the actuatable power semiconductor switches via an actuation circuit for forming an actuation signal from the control signal, wherein the H-th harmonic component is produced by the converter circuit and generally H=1, 2, 3, . . . . Typical values of H are H=−5, 7, −11, 13. The actuation signal is therefore used to actuate the power semiconductor switches.

The above method for operating the converter circuit allows the control apparatus to be used to adjust an H-th harmonic component of the system currents to a system current setpoint value. However, besides harmonic components in the system currents, harmonic components in the system voltages may also arise in an electrical AC mains system, but these cannot be adjusted using the known method described above and therefore cannot be reduced.

SUMMARY

A method for operating a converter circuit is disclosed by means of which it is possible to reduce a harmonic component in system voltages of an electrical AC mains system connected to the converter circuit. An apparatus is disclosed which can be used to carry out the method in particularly simple fashion.

A method for operating a converter circuit is disclosed, wherein the converter circuit has a converter unit (2) with a multiplicity of actuatable power semiconductor switches and is connected to a three-phase electrical AC mains system (1), in which the actuatable power semiconductor switches are actuated by means of an actuation signal ($S_A$) formed from a control signal ($S_R$), and the control signal ($S_R$) is formed by adjusting an H-th harmonic component of system currents ($i_{NH}$) to a system current setpoint value ($i_{NHref}$), wherein H=1, 2, 3, . . . , wherein the system current setpoint value ($i_{NHref}$) is formed by adjusting the absolute value of an H-th harmonic component of system voltages ($u_{NH}$) to the absolute value of a prescribable system voltage setpoint value ($u_{NHref}$).

An apparatus for carrying out a method for operating a converter circuit is disclosed, wherein the converter circuit has a converter unit with a multiplicity of actuatable power semiconductor switches and is connected to a three-phase electrical AC mains system, having a control apparatus which is used to produce a control signal ($S_R$) and which is connected to the actuatable power semiconductor switches via an actuation circuit for forming an actuation signal ($S_A$), wherein the control apparatus has a first controller unit for forming the control signal ($S_R$) by adjusting an H-th harmonic component of system currents ($i_{NH}$) to a system current setpoint value ($i_{NHref}$), wherein H=1, 2, 3, . . . , wherein the control apparatus has a second controller unit for forming the system current setpoint value ($i_{NHref}$) by adjusting the absolute value of an H-th harmonic component of system voltages ($u_{NH}$) to the absolute value of a prescribable system voltage setpoint value ($u_{NHref}$).

The converter circuit has a converter unit with a multiplicity of actuatable power semiconductor switches and is connected to a three-phase electrical AC mains system. An exemplary method for operating the converter circuit now involves the actuatable power semiconductor switches being actuated by means of an actuation signal formed from a control signal, and the control signal being formed by adjusting an H-th harmonic component of system currents to a system current setpoint value, wherein H=1, 2, 3, . . . . In line with the disclosure, the system current setpoint value is formed by adjusting the absolute value of an H-th harmonic component of system voltages to the absolute value of a prescribable system voltage setpoint value. This means that the relevant H-th harmonic component of the system voltages has a direct influence on the formation of the system current setpoint value, which means that the H-th harmonic component in the system voltages can be reduced to the desired degree.

An exemplary apparatus for carrying out the method for operating the converter circuit has a control apparatus which is used for producing the control signal $S_R$ and which is connected to the actuatable power semiconductor switches by means of an actuation circuit for forming the actuation signal, wherein the control apparatus has a first controller unit for forming the control signal by adjusting the H-th harmonic component of the system currents to the system current setpoint value and H=1, 2, 3, . . . . In accordance with the disclosure, the control apparatus now has a second controller unit for forming the system current setpoint value by adjusting the absolute value of the H-th harmonic component of system voltages to the absolute value of the prescribable system voltage setpoint value. The exemplary apparatus for carrying out the method for operating the converter circuit can therefore be implemented very easily and inexpensively, since the circuit complexity can be kept extremely low and also only a small number of components are required for the design. This apparatus can therefore be used to implement the exemplary method particularly easily.

In another aspect, an exemplary converter circuit arrangement comprises a converter unit with a plurality of actuatable power semiconductor switches, the actuatable power semiconductor switches capable of being actuated based on an actuation signal formed from a control signal; and a control apparatus connected to the actuatable power semiconductor and used to produce the control signal. The control signal is based on adjusting an H-th harmonic component of system currents to a system current setpoint value, wherein for the purpose of reducing a harmonic component in the system voltages, the system current setpoint value is formed by adjusting the absolute value of an H-th harmonic component of system voltages.

These and further objects, advantages and features of the present disclosure become obvious from the following detailed description of exemplary embodiments of the disclosure in conjunction with the drawing.

Figure 1:
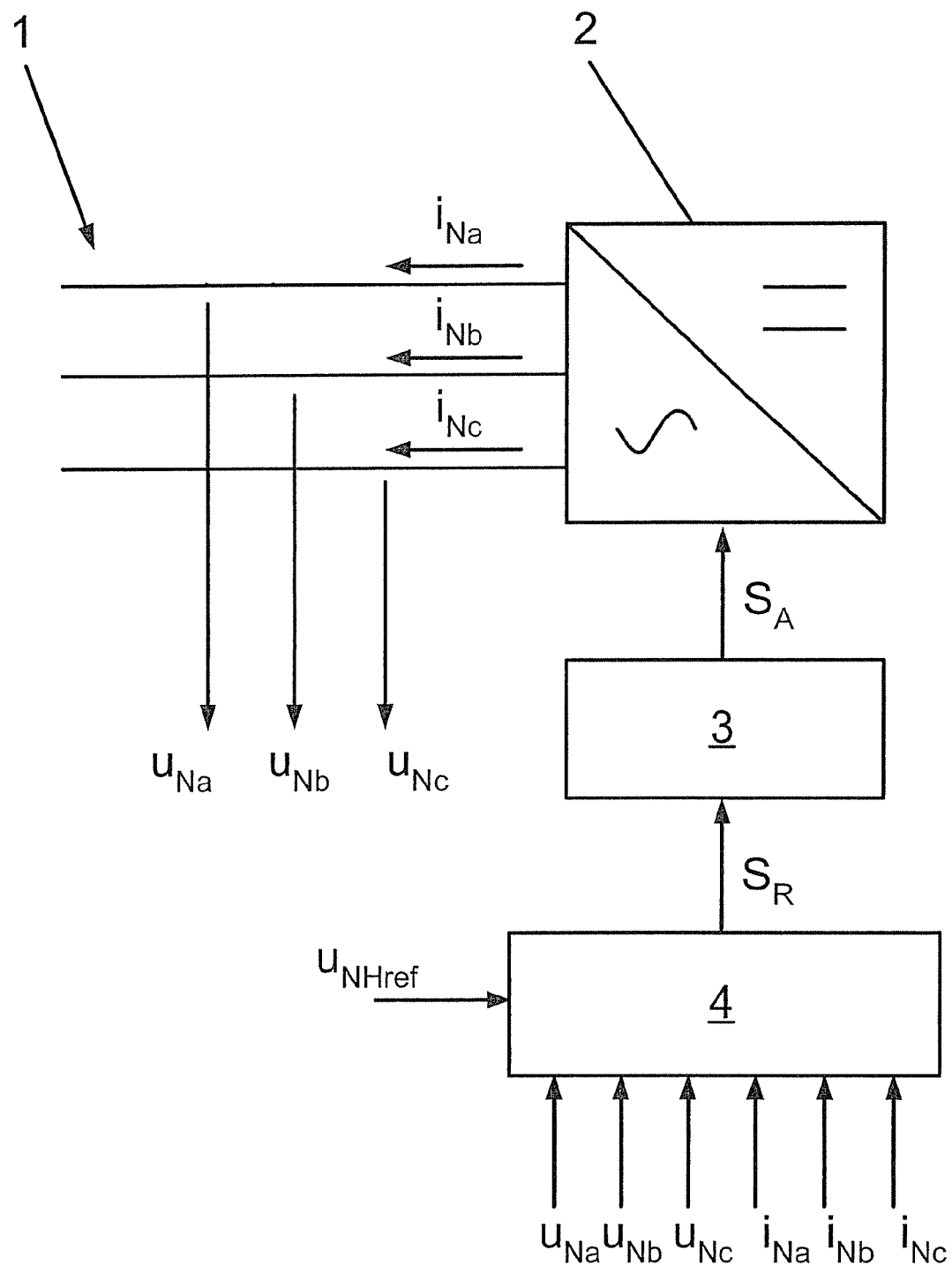
FIG. 1 shows an embodiment of an exemplary apparatus for carrying out the exemplary method for operating a converter circuit.

The reference symbols used in the drawing and their meanings are listed in summarized form in the list of reference symbols. In principle, identical parts have been provided with the same reference symbols in the figures. The embodiments described are examples of the subject matter of the disclosure and have no limiting effect.

DETAILED DESCRIPTION

Figure 3:
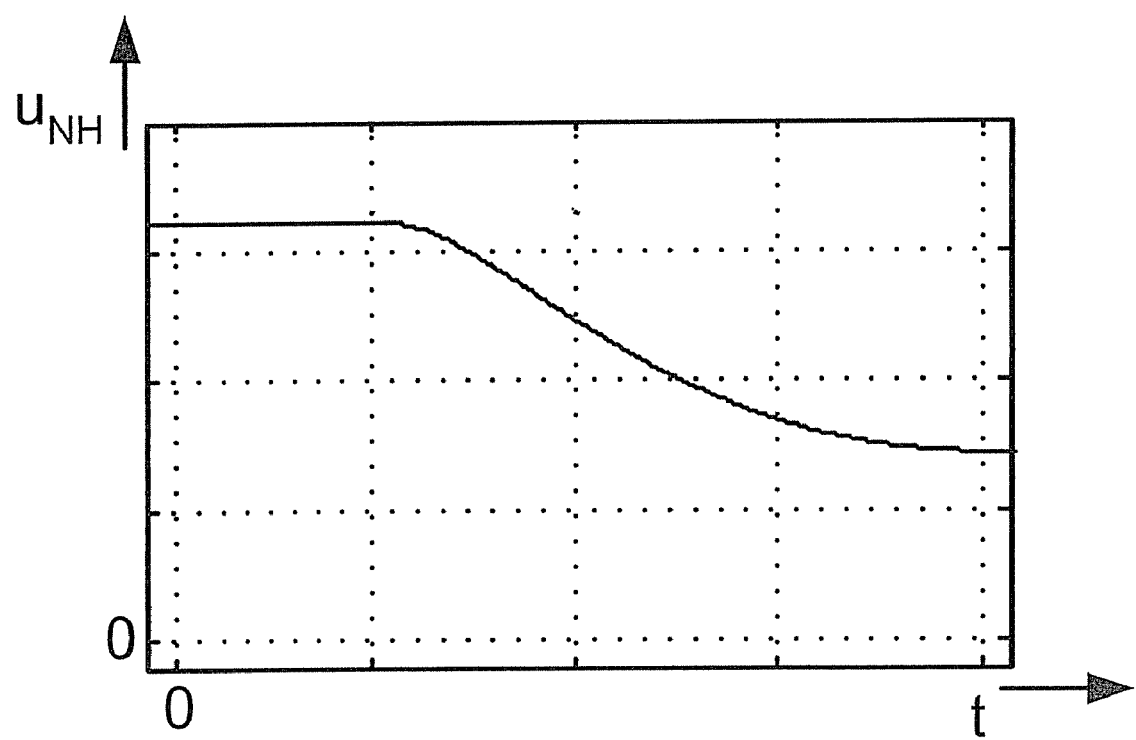
FIG. 3 shows a time profile for the absolute value of an exemplary H-th harmonic component of system voltages.

FIG. 1 shows an exemplary embodiment of an apparatus for carrying out an exemplary method for operating a converter circuit. The converter circuit in FIG. 1 has a converter unit 2 with a multiplicity of actuatable power semiconductor switches and is connected to a three-phase electrical AC mains system. It should be mentioned that the converter unit 1 may generally be in the form of any converter unit 1 for switching $\geq 2$ DC switching voltage levels (multilevel converter circuit). The exemplary method for operating the converter circuit involves the actuatable power semiconductor switches being actuated by means of an actuation signal $S_A$ formed from a control signal $S_R$, and the control signal $S_R$ being formed by adjusting an H-th harmonic component of system currents $i_{NH}$ to a system current setpoint value $i_{NHref}$, wherein H=1, 2, 3, . . . . In line with the disclosure, the system current setpoint value $i_{NHref}$ is formed by adjusting the absolute value of an H-th harmonic component of system voltages $u_{NH}$ to the absolute value of a prescribable system voltage setpoint value $u_{NHref}$. Hence, the relevant H-th harmonic component of the system voltages $u_{NH}$, particularly the absolute value of the H-th harmonic component of system voltages $u_{NH}$, has a direct influence on the formation of the system current setpoint value $i_{NHref}$, which means that the H-th harmonic component in the system voltages can be reduced to the desired degree. A time profile for the absolute value of an H-th harmonic component of system voltages $u_{NH}$ is shown in FIG. 3, in which a significant reduction in the H-th harmonic component over time t can be seen.

It has been found to be advantageous for the absolute value of the H-th harmonic component of the system voltages $u_{NH}$ to be adjusted to the absolute value of the prescribable system voltage setpoint value $u_{NHref}$ in accordance with a proportional integral characteristic, since this is distinguished by simplicity. Any other controller characteristic is also conceivable, however.

The absolute value of the H-th harmonic component of the system voltages $u_{NH}$ can be formed from the Park-Clarke transformation of the system voltages $u_{Nd}$, $u_{Nq}$, and the system current setpoint value $u_{NHref}$ can be additionally formed from the phase angle $\phi_H$ of the H-th harmonic component of the system voltages $u_{NH}$. $u_{Nd}$ and $u_{Nq}$ are the relevant components of the Park-Clarke transformation of the system voltages.

It should be mentioned that the Park-Clarke transformation is generally defined as $$\bar{x}=(x_d+jx_q)e^{j\omega t},$$

wherein $\bar{x}$ is generally a complex variable, $x_d$ is the d component of the Park-Clarke transformation of the variable $\bar{x}$, and $x_q$ is the q component of the Park-Clarke transformation of the variable $\bar{x}$. The Park-Clarke transformation involves transformation not only of the fundamental of the complex variable $\bar{x}$ but also of all harmonic components arising from the complex variable $\bar{x}$. The H-th harmonic component is therefore also included and can be extracted through simple filtering.

In respect of the exemplary method, the Park-Clarke transformation of the system voltages $u_{Nd}$, $u_{Nq}$ is formed from the space vector transformation of the system voltages $u_{N\alpha}$, $u_{N\beta}$, i.e. the system voltages $u_{Na}$, $u_{Nb}$, $u_{Nc}$ are transformed by the space vector transformation.

It should be mentioned that the space vector transformation is defined as follows $$\bar{x}=x_\alpha+jx_\beta,$$

wherein $\bar{x}$ is generally a complex variable, $x_\alpha$ is the $\alpha$ component of the space vector transformation of the variable $\bar{x}$, and $x_\beta$ is the $\beta$ component of the space vector transformation of the variable $\bar{x}$.

The H-th harmonic component of the system currents $i_{NH}$ can be formed from the Park-Clarke transformation of the system currents $i_{Nd}$, $i_{Nq}$. $i_{Nd}$ and $i_{Nq}$ are the relevant components of the Park-Clarke transformation of the system currents. In addition, the Park-Clarke transformation of the system currents $i_{Nd}$, $i_{Nq}$ can be formed from the space vector transformation of the system currents $i_{N\alpha}$, $i_{N\beta}$, e.g., the system currents $i_{Na}$, $i_{Nb}$, $i_{Nc}$ are transformed by the space vector transformation.

Figure 2:
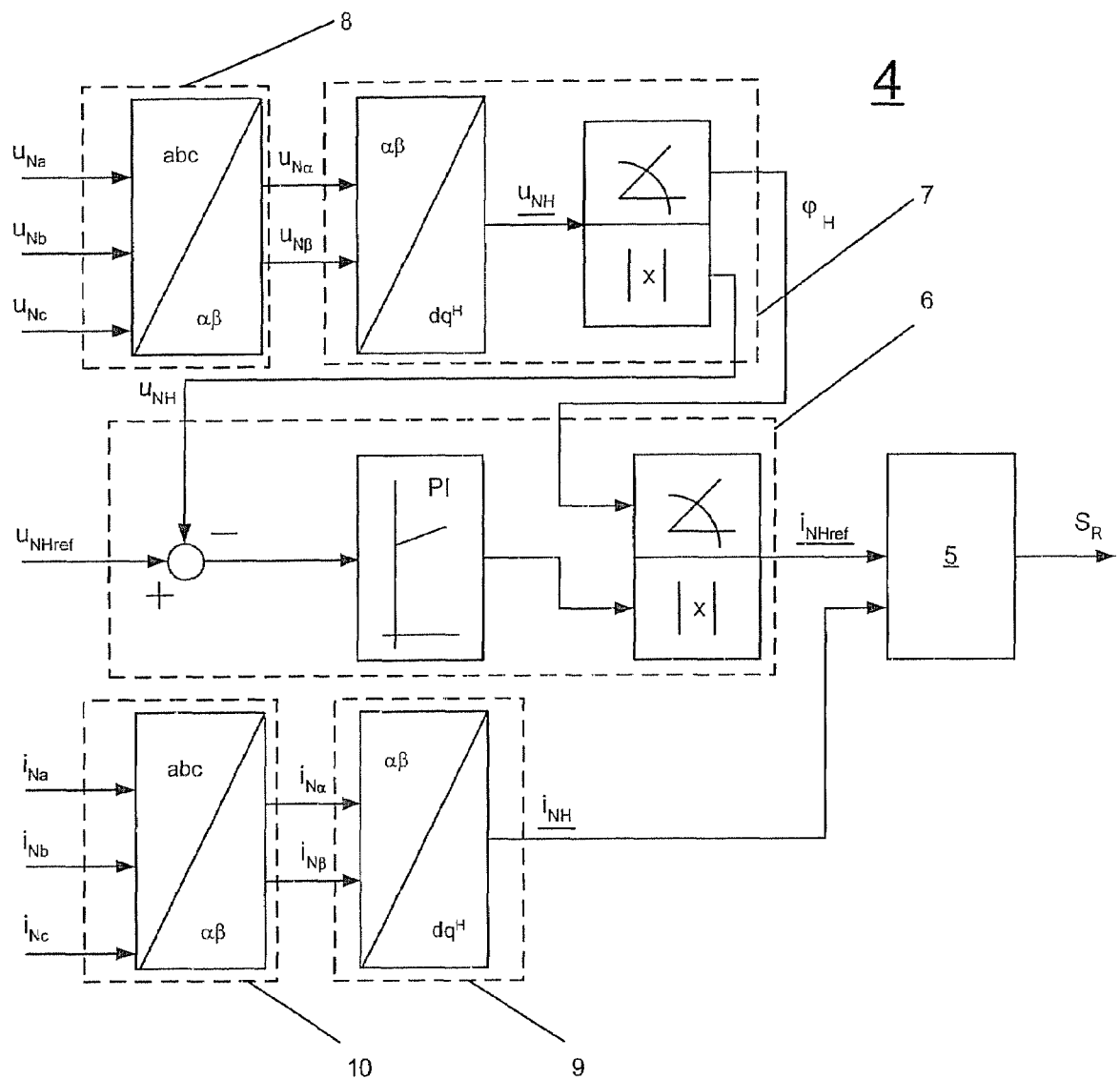
FIG. 2 shows an exemplary embodiment of a control apparatus.

As already mentioned, FIG. 1 shows an exemplary embodiment of an apparatus for carrying out an exemplary method for operating a converter circuit. The control apparatus 4 used for producing the control signal $S_R$ in FIG. 1 is connected to the actuatable power semiconductor switches of the converter unit 2 via an actuation circuit 3 for forming the actuation signal $S_A$. FIG. 2 shows an exemplary embodiment of a control apparatus 4, wherein the control apparatus 4 has a first controller unit 5 for forming the control signal $S_R$ by adjusting the H-th harmonic component of the system currents $i_{NH}$ to the system current setpoint value $i_{NHref}$ and H=1, 2, 3, . . . . In line with the disclosure, the control apparatus 4 has a second controller unit 6 for forming the system current setpoint value $i_{NHref}$ by adjusting the absolute value of an H-th harmonic component of the system voltages $u_{NH}$ to the absolute value of a prescribable system voltage setpoint value $u_{NHref}$.

Preferably, the second controller unit 6 comprises a proportional integral controller for the purpose of adjusting the absolute value of the H-th harmonic component of the system voltages $u_{NH}$ to the absolute value of the prescribable system voltage setpoint value $u_{NHref}$.

The control apparatus 4 in FIG. 2 also has a first computation unit 7 for forming the Park-Clarke transformation of the system voltages $u_{Nd}$, $u_{Nq}$ from the space vector transformation of the system voltages $u_{N\alpha}$, $u_{N\beta}$ and for forming the absolute value of the H-th harmonic component of the system voltages $u_{NH}$ from the Park-Clarke transformation of the system voltages $u_{Nd}$, $u_{Nq}$. Furthermore, the first computation unit 7 is supplied with the phase angle $\phi_H$ of the H-th harmonic component of the system voltages $u_{NH}$ for the purpose of forming the system current setpoint value $i_{NHref}$ additionally from the phase angle $\phi_H$ of the H-th harmonic component of the system voltages $u_{NH}$.

In addition, the control apparatus 4 in FIG. 2 has a second computation unit 8 for forming the space vector transformation of the system voltages $u_{N\alpha}$, $u_{N\beta}$. In addition, the control apparatus 4 comprises a third computation unit 9 for forming the Park-Clarke transformation of the system currents $i_{Nd}$, $i_{Nq}$ from the space vector transformation of the system currents $i_{N\alpha}$, $i_{N\beta}$ and for forming the H-th harmonic component of the system currents $i_{NH}$ from the Park-Clarke transformation of the system currents $i_{Nd}$, $i_{Nq}$. The control apparatus 4 also has a fourth computation unit 10 for forming the space vector transformation of the system currents $i_{N\alpha}$, $i_{N\beta}$.

The method described in detail above and the associated apparatus for carrying out the method prompts an H-th harmonic component of the system voltages $u_{NH}$ to be reduced. It goes without saying that to reduce a plurality of harmonic components of the system voltages, for example, the method explained above is carried out separately for each of these harmonic components using the appropriate method steps. In respect of the apparatus for carrying out the method, reducing the harmonic components accordingly requires an associated apparatus, as described above, for each of these harmonic components.

All of the steps of the exemplary method can be implemented in the form of software, these then being able to be loaded onto a computer system, for example, particularly with a digital signal processor, and being able to be executed thereon. In addition, the exemplary apparatus described in detail above may also be implemented in a computer system, particularly in a digital signal processor.

All in all, it has been possible to show that the exemplary apparatus—shown particularly in FIG. 1 and FIG. 2—for carrying out an exemplary method for operating the converter circuit can be implemented very simply and inexpensively, since the circuit complexity is extremely low and also only a small number of components are required for the design. Hence, this apparatus can be used to carry out the exemplary method particularly easily.

It will be appreciated by those skilled in the art that the present invention can be embodied in other specific forms without departing from the spirit or essential characteristics thereof. The presently disclosed exemplary embodiments are therefore considered in all respects to be illustrative and not restricted. The scope of the invention is indicated by the appended claims rather than the foregoing description and all changes that come within the meaning and range and equivalence thereof are intended to be embraced therein.

List of reference symbols
1 Electrical AC mains system
2 Converter unit
3 Actuation circuit
4 Control apparatus
5 First controller unit
6 Second controller unit
7 First computation unit
8 Second computation unit
9 Third computation unit
10 Fourth computation unit

What is claimed is:

1. A method for operating a converter circuit, wherein the converter circuit has a converter unit with a multiplicity of actuatable power semiconductor switches and is connected to a three-phase electrical AC mains system,
in which the actuatable power semiconductor switches are actuated by means of an actuation signal ($S_A$) formed from a control signal ($S_R$), and the control signal ($S_R$) is formed by adjusting an H-th harmonic component of system currents ($i_{NH}$) to a system current setpoint value ($i_{NHref}$), wherein H=1, 2, 3, ...,
wherein the system current setpoint value ($i_{NHref}$) is formed by adjusting the absolute value of an H-th harmonic component of system voltages ($u_{NH}$) to the absolute value of a prescribable system voltage setpoint value ($u_{NHref}$).

2. The method as claimed in claim 1, wherein the absolute value of the H-th harmonic component of the system voltages ($u_{NH}$) is formed from the Park-Clarke transformation of the system voltages ($u_{Nd}$, $u_{Nq}$), and
wherein the system current setpoint value ($i_{NHref}$) is additionally formed from the phase angle ($\phi_H$) of the H-th harmonic component of the system voltages ($u_{NH}$).

3. The method as claimed in claim 2, wherein the Park-Clarke transformation of the system voltages ($u_{Nd}$, $u_{Nq}$) is formed from the space vector transformation of the system voltages ($u_{N\alpha}$, $i_{N\beta}$).

4. The method as claimed in claim 1, wherein the H-th harmonic component of the system currents ($i_{NH}$) is formed from the Park-Clarke transformation of the system currents ($i_{Nd}$, $i_{Nq}$).

5. The method as claimed in claim 4, wherein the Park-Clarke transformation of the system currents ($i_{Nd}$, $i_{Nq}$) is formed from the space vector transformation of the system currents ($i_{N\alpha}$, $i_{N\beta}$).

6. The method as claimed in claim 1, wherein the absolute value of the H-th harmonic component of the system voltages ($u_{NH}$) is adjusted to the absolute value of the prescribable system voltage setpoint value ($u_{NHref}$) in accordance with a proportional integral characteristic.

7. An apparatus for carrying out a method for operating a converter circuit, wherein the converter circuit has a converter unit with a multiplicity of actuatable power semiconductor switches and is connected to a three-phase electrical AC mains system, having a control apparatus which is used to produce a control signal ($S_R$) and which is connected to the actuatable power semiconductor switches via an actuation circuit for forming an actuation signal ($S_A$), wherein the control apparatus has a first controller unit for forming the control signal ($S_R$) by adjusting an H-th harmonic component of system currents ($i_{NH}$) to a system current setpoint value ($i_{NHref}$), wherein H=1, 2, 3, ...,
wherein the control apparatus has a second controller unit for forming the system current setpoint value ($i_{NHref}$) by adjusting the absolute value of an H-th harmonic component of system voltages ($u_{NH}$) to the absolute value of a prescribable system voltage setpoint value ($u_{NHref}$).

8. The apparatus as claimed in claim 7, wherein the control apparatus has a first computation unit for forming the Park-Clarke transformation of the system voltages ($u_{Nd}$, $u_{Nq}$) from the space vector transformation of the system voltages ($u_{N\alpha}$, $u_{N\beta}$) and for forming the absolute value of the H-th harmonic component of the system voltages ($u_{NH}$) from the Park-Clarke transformation of the system voltages ($u_{Nd}$, $u_{Nq}$), and
wherein the first computation unit is supplied with the phase angle ($\phi$) of the H-th harmonic component of the system voltages ($u_{NH}$) for the purpose of forming the system current setpoint value ($i_{NHref}$) additionally from the phase angle ($\phi_H$) of the H-th harmonic component of the system voltages ($u_{NH}$).

9. The apparatus as claimed in claim 8, wherein the control apparatus has a second computation unit for forming the space vector transformation of the system voltages ($u_{N\alpha}$, $u_{N\beta}$).

10. The apparatus as claimed in claim 7, wherein the control apparatus has a third computation unit for forming the Park-Clarke transformation of the system currents ($i_{Nd}$, $i_{Nq}$) from the space vector transformation of the system currents ($i_{N\alpha}$, $i_{N\beta}$) and for forming the H-th harmonic component of the system currents ($i_{NH}$) from the Park-Clarke transformation of the system currents ($i_{Nd}$, $i_{Nq}$).

11. The apparatus as claimed in claim 10, wherein the control apparatus has a fourth computation unit for forming the space vector transformation of the system currents ($i_{N\alpha}$, $i_{N\beta}$).

12. The apparatus as claimed in claim 7, wherein the second controller unit comprises a proportional integral controller for the purpose of adjusting the absolute value of the H-th harmonic component of the system voltages ($u_{NH}$) to the absolute value of the prescribable system voltage setpoint value ($u_{NHref}$).

13. The method as claimed in claim 3, wherein the H-th harmonic component of the system currents ($i_{NH}$) is formed from the Park-Clarke transformation of the system currents ($i_{Nd}$, $i_{Nq}$).

14. The method as claimed in claim 5, wherein the absolute value of the H-th harmonic component of the system voltages ($u_{NH}$) is adjusted to the absolute value of the prescribable system voltage setpoint value ($u_{NHref}$) in accordance with a proportional integral characteristic.

15. The apparatus as claimed in claim 9, wherein the control apparatus has a third computation unit for forming the Park-Clarke transformation of the system currents ($i_{Nd}$, $i_{Nq}$) from the space vector transformation of the system currents ($i_{N\alpha}$, $i_{N\beta}$) and for forming the H-th harmonic component of the system currents ($i_{NH}$) from the Park-Clarke transformation of the system currents ($i_{Nd}$, $i_{Nq}$).

16. The apparatus as claimed in claim 11, wherein the second controller unit comprises a proportional integral controller for the purpose of adjusting the absolute value of the H-th harmonic component of the system voltages ($u_{NH}$) to the absolute value of the prescribable system voltage setpoint value ($u_{NHref}$).

17. A converter circuit arrangement, comprising:
a converter unit with a plurality of actuatable power semiconductor switches, the actuatable power semiconductor switches capable of being actuated based on an actuation signal formed from a control signal; and
a control apparatus to produce the control signal, wherein the control signal is based on adjusting an H-th harmonic component of system currents to a system current setpoint value, wherein for the purpose of reducing a harmonic component in the system voltages, the system current setpoint value is formed by adjusting the absolute value of an H-th harmonic component of system voltages.

18. The converter circuit arrangement as claimed in claim 17, wherein the converter unit is connected to a three-phase electrical AC mains system.

19. The converter circuit arrangement as claimed in claim 17, wherein for the purpose of reducing a harmonic component in the system voltages, the system current setpoint value is formed by adjusting the absolute value of an H-th harmonic component of system voltages to the absolute value of a prescribable system voltage setpoint value.

* * * * *